US010412651B2

United States Patent
Su et al.

(10) Patent No.: US 10,412,651 B2
(45) Date of Patent: Sep. 10, 2019

(54) USER EQUIPMENT TRIGGERED HANDOVER WITH LONG CONNECTED-DISCONTINUOUS-RECEPTION CYCLE IN CONNECTED MODE

(71) Applicant: Apple Inc., Cupertino, CA (US)

(72) Inventors: Li Su, San Jose, CA (US); Yingjie Zhao, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 14/825,494

(22) Filed: Aug. 13, 2015

(65) Prior Publication Data

US 2016/0066242 A1     Mar. 3, 2016

Related U.S. Application Data

(60) Provisional application No. 62/043,379, filed on Aug. 28, 2014.

(51) Int. Cl.
*H04W 36/00* (2009.01)
*H04W 36/30* (2009.01)
(Continued)

(52) U.S. Cl.
CPC ........ *H04W 36/30* (2013.01); *H04W 36/0033* (2013.01); *H04W 36/0083* (2013.01);
(Continued)

(58) Field of Classification Search
CPC ......... H04W 52/0216; H04W 36/0094; H04W 76/048; H04W 52/0229; H04W 52/02
See application file for complete search history.

(56) References Cited

U.S. PATENT DOCUMENTS

| 8,451,803 B2 | 5/2013 | Kitazoe |
| 2009/0238098 A1 | 9/2009 | Cai et al. |

(Continued)

FOREIGN PATENT DOCUMENTS

| EP | 2359629 | 8/2011 |
| JP | A 2001-103534 | 4/2001 |

(Continued)

OTHER PUBLICATIONS

Office Action for Japanese Patent Application No. 2015-168063, dated Jul. 7, 2016, pp. 1-6.

(Continued)

*Primary Examiner* — Khalid W Shaheed
(74) *Attorney, Agent, or Firm* — Meyertons, Hood, Kivlin, Kowert & Goetzel, P.C.; Jeffrey C. Hood

(57) ABSTRACT

While operating in connected discontinuous reception (C-DRX) mode, a wireless communication device may initiate handover operations when a neighboring base station is determined by the wireless communication device to be a better serving cell than a base station operating as the current serving cell for the wireless communication device. Instead of transmitting a measurement report to the current serving cell, the wireless communication device may select one of the neighboring base stations as the new serving cell, responsive to measurements of the current serving cell and the neighboring cells performed by the wireless communication device during the on-duration of the C-DRX cycle. This enables a longer C-DRX cycle, which leads to the wireless communication device saving more power during non-real-time sensitive background data transmissions, while also avoiding higher handover failure rates and extra Radio Resource Control signaling that may need to be performed as a result of radio link failure.

17 Claims, 5 Drawing Sheets

(51) Int. Cl.
 *H04W 36/36* (2009.01)
 *H04W 76/19* (2018.01)
 *H04W 76/28* (2018.01)
(52) U.S. Cl.
 CPC ............ *H04W 36/36* (2013.01); *H04W 76/19* (2018.02); *H04W 76/28* (2018.02); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/23* (2018.01); *Y02D 70/24* (2018.01); *Y02D 70/26* (2018.01)

(56) References Cited

U.S. PATENT DOCUMENTS

| | | | | |
|---|---|---|---|---|
| 2010/0015984 A1* | 1/2010 | Kazmi | ............ | H04W 36/0088 455/437 |
| 2010/0111039 A1 | 5/2010 | Kim | | |
| 2010/0124172 A1 | 5/2010 | Tenny | | |
| 2010/0166184 A1* | 7/2010 | Wu | ............ | H04W 12/04 380/270 |
| 2011/0028150 A1* | 2/2011 | Kone | ............ | H04W 36/0061 455/436 |
| 2012/0087264 A1* | 4/2012 | Lindoff | ............ | H04L 5/0048 370/252 |
| 2012/0236707 A1* | 9/2012 | Larsson | ............ | H04W 76/028 370/217 |
| 2012/0270552 A1* | 10/2012 | Shi | ............ | H04W 36/0055 455/438 |
| 2013/0260811 A1 | 10/2013 | Rayavarapu | | |
| 2014/0099955 A1 | 4/2014 | Nukala et al. | | |

FOREIGN PATENT DOCUMENTS

| | | |
|---|---|---|
| JP | 2012509620 | 4/2012 |
| JP | A 2014-103682 | 6/2014 |
| WO | 2013106473 | 7/2013 |
| WO | 2015013068 | 1/2015 |
| WO | 2015026084 | 2/2015 |

OTHER PUBLICATIONS

Office Action for German Patent Application No. DE102015216090.4, dated Jan. 12, 2017, pp. 1-146.
Office Action, Application No. 201510536805.2, dated Apr. 24, 2018, 23 pages.
Office Action, Japanese Patent Application No. 2015-168063, dated Sep. 10, 2018, 6 pages.

* cited by examiner

USER EQUIPMENT TRIGGERED HANDOVER WITH LONG CONNECTED-DISCONTINUOUS-RECEPTION CYCLE IN CONNECTED MODE

PRIORITY CLAIM

This application claims benefit of priority of U.S. Provisional Patent Application Ser. No. 62/043,379 titled "User Equipment Triggered Handover with Long Connected-Discontinuous-Reception Cycle in Connected Mode", filed on Aug. 28, 2014, which is hereby incorporated by reference as though fully and completely set forth herein.

FIELD OF THE INVENTION

The present application relates to wireless communication devices, and more particularly to methods for performing handover operations triggered by a user equipment.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. In general, wireless communication technologies, such as cellular communication technologies, are substantially designed to provide mobile communication capabilities to wireless devices generally powered by a portable power supply, e.g., a battery. Batteries hold a finite charge, and so in order to improve battery life of wireless devices, one approach is to reduce power consumption required to perform wireless communications. Accordingly, some wireless communication technologies implement features designed to conserve power while still providing a high-quality user experience. Generally speaking, portions of circuitry in a wireless may be powered down when not in use in order to save power and conserve battery life.

One significant consumer of power in a wireless device is transmitter and receiver circuitry (hereinafter 'wireless circuitry' or 'transceiver circuitry') that enables wireless communications. One example of a power saving technique developed to save power in transceiver circuitry is known as discontinuous reception (or DRX). In devices utilizing DRX, portions of wireless circuitry may be powered down if there is no information (e.g., packets) to be received or transmitted. The wireless circuitry may periodically be powered on to determine if there is information to be received, and subsequently powered back down again if such a determination indicates that no new information is incoming. A device utilizing DRX may determine from a header in a transmitted packet if the information contained therein is incoming for that device. If the information is not relevant to that device, then circuitry may be powered down for at least a portion of the remainder of the packet, and subsequently powered on before the next header. Polling is another technique that may be used, wherein a device may periodically send a beacon to an access point or base station to determine if there is any information waiting for reception. If no information is awaiting reception, portions of the wireless circuitry may be powered down until the next beacon is to be transmitted. In addition to determining if information is awaiting reception by the mobile device, neighbor cell searching may be conducted during the time when the wireless circuitry is powered up while operating in a DRX mode. Neighbor cell searching may be performed in order to enable cell reselection and handover of the mobile device from one cell to another.

In general, DRX has been introduced in several wireless standards such as UMTS (Universal Mobile Telecommunications System), LTE (Long-term evolution), WiMAX, etc., which powers down most of user equipment (UE) circuitry when there are no packets to be received or transmitted, and only wakes up at specified times or intervals to listen to the network. DRX can be enabled in different network connection states, including connected mode and idle mode. In connected DRX (C-DRX) mode, the UE listens to the downlink (DL) packets following a specified pattern determined by the base-station (BS). In idle DRX (I-DRX) mode, the UE listens to the page from the BS to determine if it needs to reenter the network and acquire the uplink (UL) timing. Because DRX allows the UE to switch off its transceiver circuitry for short intervals when there is no data to receive or transmit, and start "wake up and sleep" cycles to check whether there is data to send or receive, operating in C-DRX mode helps decrease battery usage.

To save more power on the User Equipment (UE) side, it is desirable to configure a long C-DRX cycle in LTE connected mode, especially when there is only non-real-time-sensitive background data present. For example, currently a network (NW) configured C-DRX cycle is 320 ms (milliseconds), and it may be desirable to make that cycle longer, for example 640 ms. However, 3GPP special item simulations indicate that a UE in connected mode with a C-DRX cycle of 640 ms (or longer) experiences higher handover (HO) fail rates. The increased HO fail rates can be explained by the fact that when the UE wakes up and enters the on-duration during the longer C-DRX cycle, the currently serving cell (base station) may be too weak as a result of the UE having moved within range of a far cell during the OFF time of the now longer C-DRX cycle. For example, the NW may have difficulty decoding a measurement report message from the UE that indicates that neighbor base stations (cells) are better than the current serving base station, or a serving base station downlink signal may be too weak to be decoded by the UE. The latter may result in the UE's inability to decode the Physical Downlink Control Channel (PDCCH) and/or the Physical Downlink Shared Channel (PDSCH). This means that the UE may not be receiving an HO command before the radio link failure was declared. These issues may lead to higher HO failure rates and higher radio link failure rates, triggering the UE to send an extra Radio Resource Control (RRC) connection re-establishment message to a neighbor base station better positioned than the current base station in re-establishing an RRC connection.

SUMMARY OF THE INVENTION

Some embodiments described herein relate to a User Equipment (UE) device and associated method for saving power in a radio receiver implemented in a wireless communications device. A connection with a wireless network (NW) that includes a base station may be established via a wireless connection. The communication may take place in a connected discontinuous reception (C-DRX) mode. According to various embodiments, the UE may trigger a handover (HO) procedure by initiating an RRC connection re-establishment to a neighboring base station when the neighboring base station is determined to be better positioned as a serving cell (or determined to be a better serving cell) than a base station currently operating as the serving cell (or operating as the currently serving cell). Accordingly, the HO from the network side may not be initiated in response to a measurement report that was sent to the current serving cell by the UE. This enables a longer C-DRX cycle in order to save more UE power during non-real-time sensitive background data transmissions, while also avoiding higher HO failure rates and extra Radio Resource Control (RRC) signaling due to radio link failure. In general, as will be further detailed below, the UE is said to "trigger an HO procedure" when the UE reestablishes (or initiates reestablishment of a) connection with a neighboring base station that is different from a current serving base station, to initiate an HO from the network side. In other words, the actual HO may be initiated by the network, but the HO is initiated responsive to the UE triggering the HO procedure by reestablishing connection with a neighboring base station different from the current(ly) serving base station, as opposed to the HO being initiated responsive to a measurement report sent by the UE to the current serving base station.

In some embodiments, when the UE enters the on-duration (ON time) of a C-DRX cycle, the UE may measure the currently serving cell (base station) and neighboring cells (base stations). The measurements may include various radio quality measurements to assess which base station would best facilitate communication of the UE. If the measurement for the current serving cell is within a specified range (for example, within a specified number N of decibels or dBs) of the radio link failure threshold, and there is a better neighboring cell, and the measurement corresponding to the serving cell (or serving cell measurement) and the measurement corresponding to the neighboring cell (or the neighboring cell measurement) both meet the HO threshold, i.e. the criteria for initiating an HO, then instead of sending a measurement report message to the current (or currently) serving cell, the UE may select the best neighboring (or neighbor) cell (base station) as the new serving cell, and send an RRC connection reestablishment message to this new serving cell. The new serving cell may then fetch the UE context information from the old serving cell whose cell ID may be included in the RRC connection reestablishment message, and reestablish RRC connection with the UE on the new serving cell. This eliminates the need for additional (extra) RRC signaling, including eliminating the need for the UE to transmit a measurement report and RRC connection reconfiguration for an HO which most probably would fail, and also enables a longer C-DRX cycle to be configured in the network to save more UE power in connected mode.

In further accordance with the above, a first base station within communicating range of a wireless communication device—but not currently operating as a serving cell for the wireless communication device—may receive from the wireless communication device an RRC connection reestablishment message transmitted by the wireless communication device in order to trigger a handover procedure. Responsive to receiving the RRC connection reestablishment message, the first base station may initiate a handover operation, from a second base station—currently operating as the serving cell for the wireless communication device— to the first base station. The RRC connection reestablishment message may include information corresponding to the second base station. Based on the information included in the RRC connection reestablishment message, the first base station may fetch device context information from the second base station as part of initiating the handover procedure. The first base station may then establish RRC connection with the wireless communication device according to the device context information.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
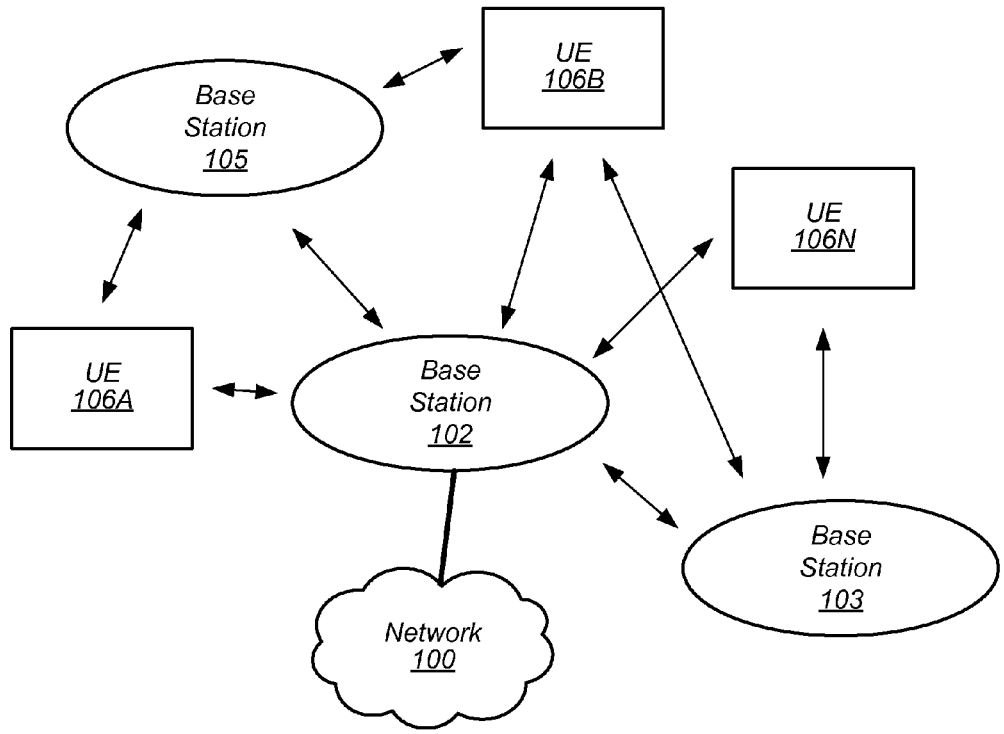
FIG. 1 illustrates an exemplary (and simplified) wireless communication system.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

BLER: Block Error Rate (same as Packet Error Rate)
BER: Bit Error Rate
BS: Base Station
C-DRX: Connected Discontinuous Reception
CRC: Cyclic Redundancy Check
DL: Downlink
DRX: Discontinuous Reception
GSM: Global System for Mobile Communication
LTE: Long Term Evolution
PDCCH: Physical Downlink Control Channel
PDSCH: Physical Downlink Shared Channel
PER: Packet Error Rate
PUCCH: Physical Uplink Control Channel
PUSCH: Physical Uplink Shared Channel SFN: System Frame Number
SINR: Signal to Interference-and-Noise Ratio
SIR: Signal to Interference Ratio
SNR: Signal to Noise Ratio
SPS: Semi Persistent Scheduling
TX: Transmission
UE: User Equipment
UL: Uplink
UMTS: Universal Mobile Telecommunication System
VoLTE: Voice over LTE Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
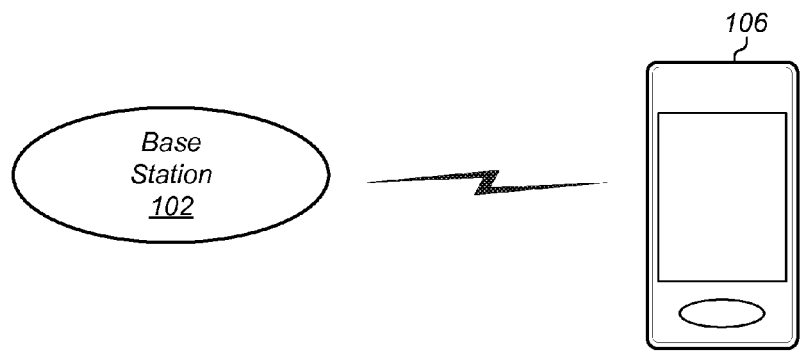
FIG. 2 illustrates an exemplary base station in communication with an exemplary wireless user equipment (UE) device.

FIGS. 1 and 2—Exemplary Communication Systems

FIG. 1 illustrates an exemplary (and simplified) wireless communication system. It is noted that the system of FIG. 1 is merely one example of a possible system, and embodiments may be implemented in any of various systems, as desired. As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106A-106N are referred to as UEs or UE devices. Furthermore, when referring to an individual UE in general, user devices are also referenced herein as UE 106 or simply UE.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." Furthermore, the base station servicing the coverage area referred to as a "cell" is also referenced herein as a "serving cell". In other words, base station 102 may be referred to as a "serving cell" to denote that base station 102 facilitates communication between the user devices and/or between the user devices and the network 100. As also used herein, from the perspective of UEs, a base station may sometimes be considered as representing the network (NW) insofar as uplink and downlink communications of the UE are concerned. Thus, a UE communicating with one or more base stations in the network (NW) may also be interpreted as the UE communicating with the NW.

As also shown in FIG. 1, the exemplary (and simplified) wireless communication system may also include additional base stations, for example base stations 103 and 105 (of course alternate embodiments may include more or fewer base stations), which may communicate with one or more of the other base stations as shown. For example, base station 102 may communicate with base station 105 and base station 103. Similar to base station 102, base station 103 and base station 105 may also facilitate communication between various ones of the user devices and/or between various ones of the user devices and the network 100, as shown. The different base stations may be considered to serve different cells, while the different cells may feature overlapping coverage areas. A UE device moving in and out of different coverage areas may lead to a need for handing over facilitation of the communication of the UE device from a currently serving base station to a different base station. For example, UE 106A may be serviced by base station 102, but UE 106A may subsequently move into a coverage area (or cell) primarily serviced by base station 105, in which case the communication of UE 106A may be handed over, by way of a handover (HO) procedure from base station 102 to base station 105. Subsequent to and resulting from the HO procedure, communication of the UE 106A is facilitated by base station 105. Various embodiments will be further described herein, whereby the UE device may trigger such an HO procedure leading to an HO being performed from the network side.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). Thus, in some embodiments, the UE 106 may be configured to communicate with base station 102 according to a first cellular communication standard (e.g., LTE) and might also be configured to communicate with other base stations according to a second cellular communication standard (e.g., one or more CDMA2000 cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates one example of a user equipment 106 (e.g., one of the devices 106-1 through 106-N) in communication with a base station 102. The UE 106 may be a device with wireless network connectivity such as a mobile phone, a hand-held device, a computer or a tablet, or virtually any type of wireless device. The UE 106 may include processing hardware, which may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments of UE triggered handover described herein, or any portion of any of the method embodiments of UE triggered handover described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating over a wireless network using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and Bluetooth. Other configurations are also possible.

Figure 3:
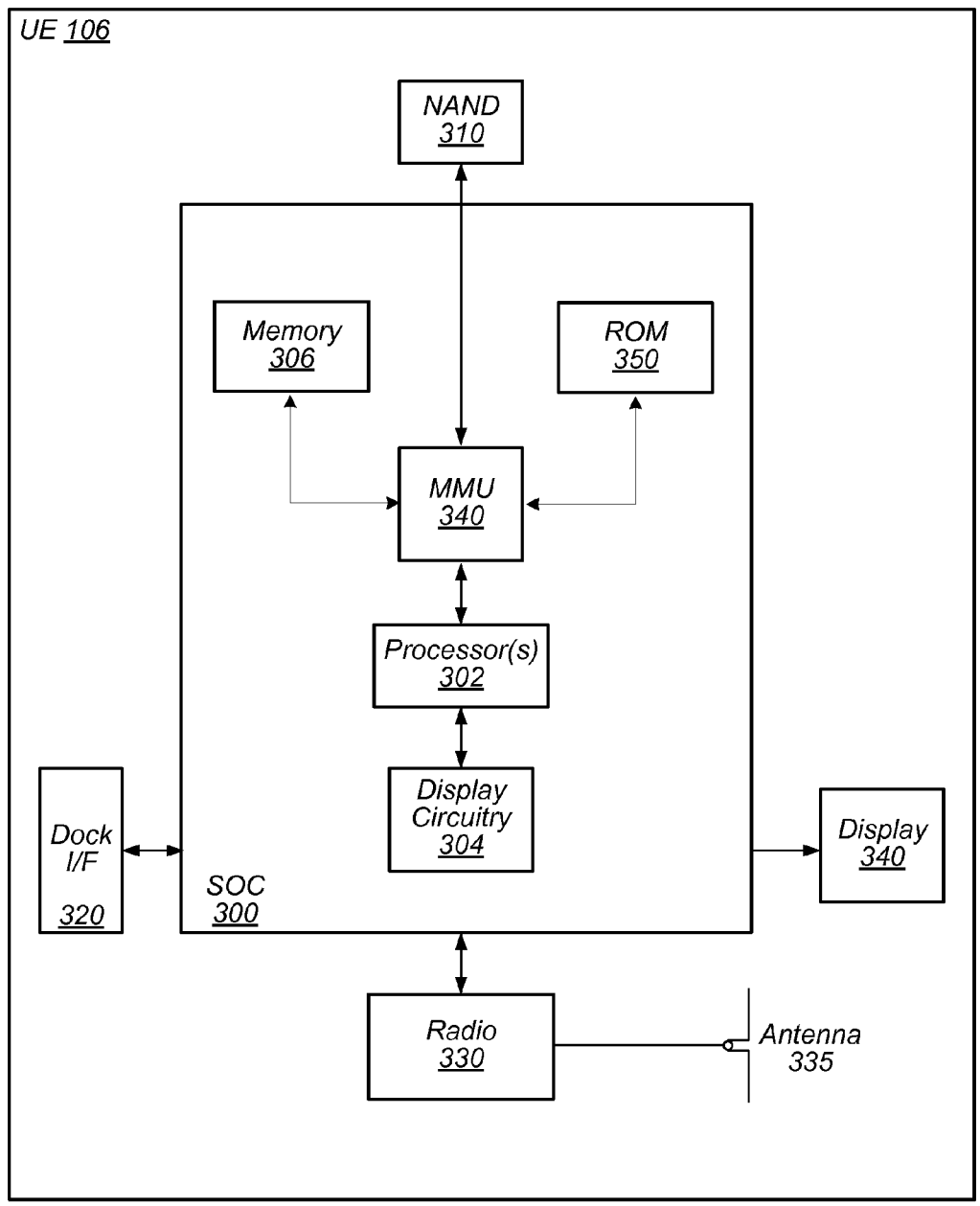
FIG. 3 illustrates an exemplary block diagram of a UE, according to some embodiments.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The various components, or any number of the components within UE 106, excluding the antenna 335, may be collectively referred to as "processing hardware". The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, LTE-A, CDMA2000, Bluetooth, Wi-Fi, GPS, etc.). The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further subsequently herein, the UE 106 may include hardware and software components for implementing a method for performing handover (HO) operations while operating in C-DRX mode. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Furthermore, processor 302 may be coupled to and/or may interoperate with other components as shown in FIG. 3, to facilitate performing HO operations, as will be further described below in the section "Handover (HO) procedure during extended C-DRX cycles".

Figure 4:
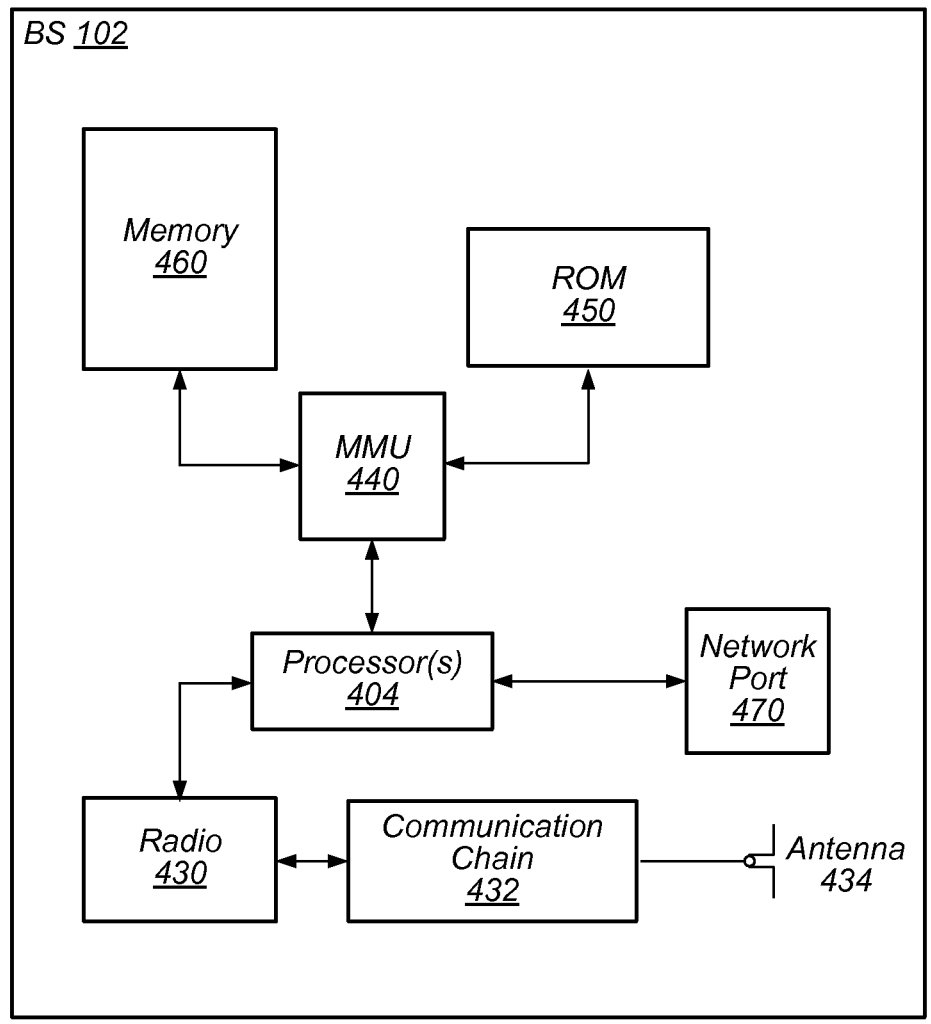
FIG. 4 illustrates an exemplary block diagram of a base station, according to some embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices. Again, the hardware components within BS 102, not including antenna 434, or any subset of the various hardware components within BS 102 may be collectively referred to as "processing hardware".

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc. The processor 404 of the base station 102 may be configured to implement part or all of the methods to perform HO operations described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

DRX

The parameters for DRX cycles may be configured by the BS (e.g. BS 102) through different timers. The DRX inactivity timer indicates the time in number of consecutive subframes to wait before enabling DRX. Short DRX cycles and long DRX cycles are defined to allow the BS to adjust the DRX cycles based on the application categories and associated characteristics. A DRX short cycle timer may be defined to determine when to transition to the long DRX cycle. When there is no reception of packets for an extended period of time after the successful reception of a packet, the BS may initiate RRC connection release and the UE may enter the RRC IDLE state, during which the idle DRX can be enabled. The On-Duration timer may be used to determine the number of frames over which the UE will read the DL control channel every DRX cycle before entering power saving mode. Exemplary allowed values are 1, 2, 3, 4, 5, 6, 8, 10, 20, 30, 40, 50, 60, 80, 100, and 200. During idle DRX mode, the UE may monitor one paging occasion (PO) per DRX cycle, which is one subframe.

Figure 5:
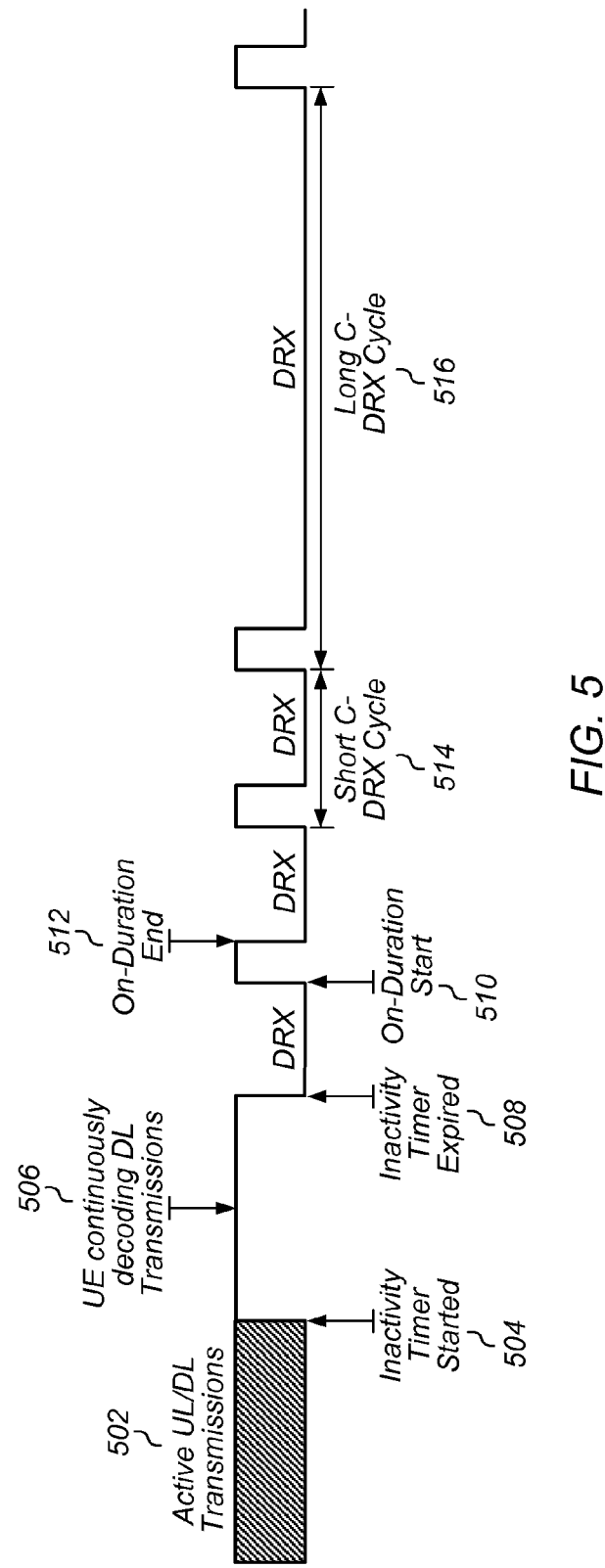
FIG. 5 is a timing diagram illustrating one example of general operations of a C-DRX capable wireless communications device over a period of time, according to some embodiments.

FIG. 5 illustrates various aspects of general C-DRX operation. As indicated by 602, the UE 106 may operate in an active state and may perform one or more uplink and/or downlink (UL/DL) transmissions (e.g., transmit uplink data and/or receive downlink data). At 504, an inactivity timer may be initiated. The inactivity timer may be initiated at the end of the active transmissions in 502. Note that the inactivity timer may have been initiated one or more times during the active transmissions in 502, but may have been reset each time as a result of continuing activity (transmissions) until no more activity was observed at 504, at which point it may run until expiration at 508. The inactivity timer may have any length, as desired; some examples of possible inactivity timer length might include 100 ms, 80 ms, 50 ms, 40 ms, or any other value, e.g., as specified by the 3GPP 36.331 specification.

In 506, between initiation (at 504) and expiration (at 508) of the inactivity timer, the UE 106 may not be performing any uplink or downlink transmissions, but may continue to operate in the active state, and may monitor one or more communication channels (e.g., a PDCCH) for downlink grants. At 508, the inactivity timer may expire. At this point the UE 106 may transition to a reduced-power state (DRX), as a result of having observed a sufficient period of data communication inactivity (e.g., as indicated by the expiration of the inactivity timer). During the period of time that the UE 106 is operating in the reduced-power state, the UE 106 may power down and/or reduce power to one or more components, such as baseband logic components and/or radio components.

At 510, the UE 106 may "wake-up" and re-enter the active state. The UE 106 may wake up at a time specified by a schedule, e.g., of which it may be informed by a base station (e.g., an eNode-B, in LTE). At the specified time (or after a specified interval), the base station may notify the UE 106 of a downlink grant for the UE 106, if there is any downlink data pending, so the UE 106 may check (e.g., monitor a communication channel such as a PDCCH) for downlink grants during this time. One or more other functions may also be performed during this time, if desired. This time period may also be referred to as the "on-duration" in C-DRX operation. According to some embodiments, the on-duration may last a specified length of time, such as 5 ms, or 10 ms, or another length of time, e.g., as specified by the 3GPP 36.331 specification; alternatively, the on-duration may last until certain functions have been performed, and may end when no further specified functions need to be performed. At 512, the on-duration may end, and if no downlink grants were received during the on-duration, the UE 106 may go back to "sleep" and transition back into the reduced-power state. Any number of subsequent cycles of sleeping (DRX) and waking (on-duration) may be performed, as desired.

Note that the UE 106 may also be configured to transition between C-DRX cycles with different lengths. For example, as shown, the UE 106 may perform up to a pre-determined number (such as 2, 4, 8, 16, etc.) of "short C-DRX" cycles 514 (which may last 20 ms, 40 ms, 80 ms, or any other length of time), and if no uplink or downlink transmission are performed by the end of the pre-determined number of cycles, the UE 106 may perform one or more "long C-DRX" cycles 516 (which may last 80 ms, 160 ms, 320 ms, or any other length of time, e.g., as specified by 3GPP 36.331), which may specify a longer period of reduced-power state operation before waking up for active state on-duration operations. It should be noted here, that in order to save power, it may be desirable to extend the long C-DRX cycle. For example, the current maximum value for a long C-DRX cycle may be specified to be 320 ms, but it may be advantageous to extend the length of that cycle to 640 ms, for example, in order to potentially extend the period of inactivity, and thus reduce power consumption of UE 106. The long C-DRX cycles may continue until further active communication (e.g., which may be initiated either by the UE 106 or the network) occurs, or one or more other conditions occur which might cause the UE 106 to transition away from the long C-DRX cycles.

If active communications are again initiated at some subsequent time, the UE 106 may perform similar steps (e.g., monitoring activity/inactivity via an inactivity timer and initiating one or more C-DRX cycles if sufficient inactivity is seen between active communications) if appropriate, e.g., depending on communication activity.

Handover (HO) Procedure During Extended C-DRX Cycles

Communication, for example between a UE (such as UE 106 in FIG. 1) and a BS (e.g. BS 102 in FIG. 1) may occur in C-DRX mode. Referring to FIG. 1, by way of example, UE 106B may be communicating in a cell serviced by base station 102, which would therefore be considered the serving cell, or, in other words, it may be considered the serving base station for UE 106B. Base stations 103 and 105 may also be neighboring base stations to UE 106B, and as UE 106B moves around, it may move out of the (primary) coverage area of base station 102 and into the (primary) coverage area of base station 103. As the UE is moving around, it may trigger a handover (HO) procedure to initiate an HO from the network side, upon the UE determining that a neighboring base station (e.g. BS 103 or BS 105) is a better serving cell than a base station operating as the current serving cell (e.g. BS 102). In such a case, the UE (e.g. UE 106B) may initiate reestablishment of an RRC connection to a better neighbor base station, with an HO initiated responsive to the initiation of reestablishment of an RRC connection to the better serving base station. In other words, the HO may not be initiated responsive to a measurement report that was transmitted to the current serving base station by the UE, but may instead be initiated responsive of the UE initiating reestablishment of an RRC connection to a better serving base station. This enables a longer C-DRX cycle, which reduces the power consumed by the UE during non-real-time sensitive background data transmissions, while also avoiding higher HO failure rates and extra Radio Resource Control (RRC) signaling due to radio link failure.

In some embodiments, when the UE enters the on-duration (or ON time) of a C-DRX cycle, the UE may perform a variety of measurements associated with the currently serving base station and one more neighboring base stations. More specifically, the UE may measure the radio quality of the currently serving base station and one or more neighboring base stations. For example, the UE may measure neighbor cells' (neighbor base stations') radio quality indications such as RSSI (Received Signal Strength Indicator), RSCP (Reference [Received] Signal Code Power), and RSRQ (Reference Signal Received Quality), and may also measure its serving cell's (serving base station's) radio quality indications such as RSSI, RSCP, and RSRQ. The UE may also measure other indicators if/when applicable and/or available.

If the measurement for the current serving cell is within a specified range, for example within a specified number N decibels (dBs) of the radio link failure threshold, and there is a better neighboring cell, and the serving cell measurement and neighbor cell measurement both meet previously specified criteria considered to be an indication that an HO is to be performed (in other words, the measurements both meet an HO threshold), then the UE may select the best neighbor cell (base station) as the new serving cell, and trigger an HO procedure to have an HO initiated from the network side to the new serving cell. The HO may then be initiated in response to this triggering mechanism, and not in response to the UE transmitting a measurement report message to the currently serving cell.

In one set of embodiments, the UE may trigger an HO procedure by initiating an RRC connection reestablishment with a new serving cell responsive to the measurements, and at least one of the following conditions being met:

First condition: The serving base station's measured radio quality being close to a specified radio link failure threshold. For example, the serving base station's measured radio quality, for example RSCP, may be −100 dBm, and the specified radio link failure threshold may be set to −102 dBm. In this case the radio quality of the currently serving base station is 2 dBm higher than the radio link failure threshold. If the specified value of N for which the currently serving base station may be considered to be "close to the radio link failure threshold" is "3", than in this case the radio quality of the currently serving base station is considered to be close to the radio link failure threshold, and the first condition is met.

Second condition: The measured radio quality of one of the neighboring base stations being better than the measured radio quality of the currently serving base station.

Third condition: The difference between the radio quality measurement of the currently serving base station and the radio quality measurement of one of the neighbor base stations meeting an HO threshold requirement. HO threshold refers to any condition interpreted as a go-ahead or an indication to perform an HO. For example, the HO threshold value may be set to 4 dBm, meaning that an HO is to occur when a neighbor cell's radio quality is at least 4 dB better than a currently serving cell's radio quality. If the RSCP measurement value of the currently serving cell (base station) is −100 dBm, and the RSCP measurement value of the neighbor cell (base station) is −80 dBm, then the different between the radio quality measurements is 20 dB, which is higher than the threshold value of 4 dBms, and therefore the HO threshold is met.

The UE may trigger the HO procedure by sending Radio Resource Control (RRC) connection reestablishment message to the newly selected serving cell. The RRC message may include the cell ID of the currently serving cell (base station). The new serving cell may then fetch the UE context information from the currently serving cell whose cell ID is included in the RRC connection reestablishment message, and reestablish RRC connection with the UE on the new serving cell, making the new serving cell the current serving cell. This eliminates the need for additional (extra) RRC signaling, including the UE transmitting a measurement report and RRC connection reconfiguration for an HO which most probably would fail, and also enables a longer C-DRX cycle to be configured in the NW to save more UE power in connected mode.

Exemplary Method of UE Triggered Handover

Figure 6:
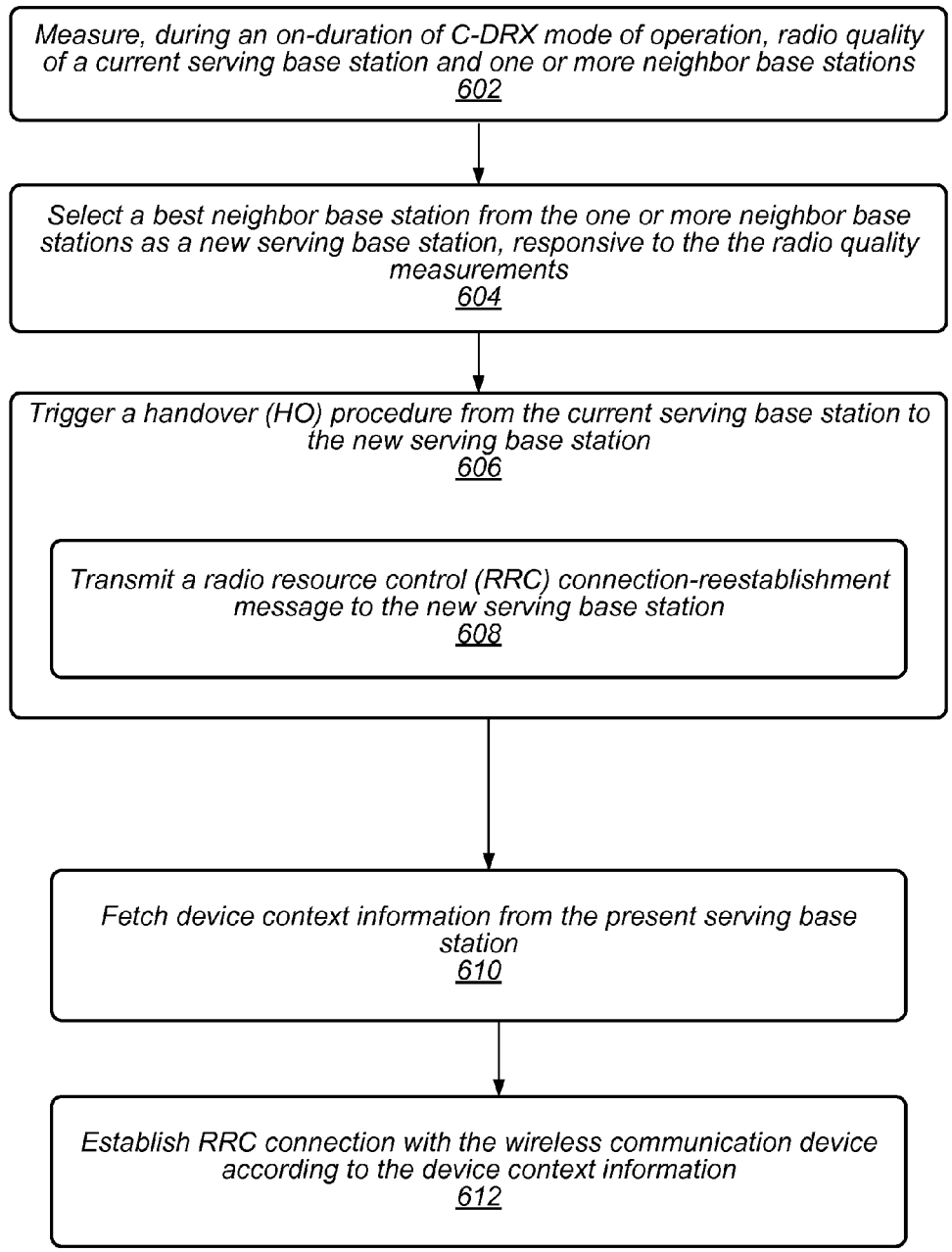
FIG. 6 is a flowchart diagram illustrating one example of a method for a wireless user equipment device triggering a handover procedure in a wireless network while operating in C-DRX mode, according to some embodiments.

FIG. 6 shows a flow diagram illustrating one example of a method for a wireless communication device (or UE or UE device) triggering a handover procedure to initiate a handover from the network side in a wireless network while operating in C-DRX mode, according to some embodiments. As shown in FIG. 6, during an on-duration of a C-DRX cycle, the wireless communication device may measure the radio quality of a current serving base station and one or more neighbor base stations (602). The wireless communication device may then select one of the neighbor base stations from the one or more neighbor base stations as a new serving base station, based on the radio quality measurements of the current serving base station and the neighbor base stations (604). For example, the wireless communication device may select the neighbor station if the measured radio quality of the current serving base station is close enough to a radio link failure threshold, the measured radio quality of the neighbor station is better than the measured radio quality of the current serving base station, and the difference between the measured radio quality of the current serving base station and the measured radio quality of the neighbor station is greater than a specified HO threshold value.

The wireless communication device may then trigger a handover (HO) procedure from the current serving base station to the new serving base station, responsive to having selected the new serving base station (606). The wireless communication device may trigger the HO procedure by transmitting a radio resource control (RRC) connection-reestablishment message to the new serving base station (608). The RRC connection-reestablishment message may include information corresponding to the current serving base station, to facilitate initiation of the HO from the network side. In some embodiments, the wireless communication device may select the best neighbor base station and trigger the HO procedure in lieu of transmitting a measurement report message to the current serving base station.

The method may further include the new serving base station (cell) fetching device context information from the present serving base station, responsive to the RRC connection-reestablishment message transmitted by the wireless communication device to the new serving base station, as part of initiating the HO procedure (610). The new serving base station may then establish an RRC connection with the wireless communication device according to the device context information (612).

Various Embodiments

Embodiments of the present invention may be realized in any of various forms. For example, some embodiments may be realized as computer-implemented methods, computer-readable memory mediums, or a computer systems. Other embodiments may be realized using one or more custom-designed hardware devices such as ASICs. In other embodiments, one or more programmable hardware elements such as FPGAs may be used.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a wireless communication device, or UE device) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless communication device comprising:
one or more antennas configured to transmit and receive wireless communication over a wireless network; and
processing hardware configured to interoperate with the one or more antennas and cause the wireless communication device to:
measure a current serving base station and one or more neighbor base stations upon the wireless communication device entering an on-duration of a connected discontinuous (C-DRX) mode of operation;
select a best neighbor base station from the one or more neighbor base stations as a new serving base station responsive to measuring the current serving base station and the one or more neighbor base stations; and
transmit a radio resource control (RRC) connection-reestablishment message to the new serving base station to have the new serving base station initiate a handover operation to the new serving base station.

2. The wireless communication device of claim 1, wherein the RRC connection-reestablishment message includes information identifying the current serving base station.

3. The wireless communication device of claim 1, wherein the processing hardware is configured to further cause the wireless communication device to select the best neighbor base station as the new serving base station responsive to at least one of the following:
a measured radio quality of the current serving base station differing from a radio link failure threshold by no more than a specified amount;
a measured radio quality of at least one of the one or more neighbor base stations being better than the measured radio quality of the current serving base station; or
a difference between the measured radio quality of the current serving base station and the measured radio quality of the at least one of the one or more neighbor base stations meeting a handover threshold.

4. The wireless communication device of claim 1, wherein the processing hardware is configured to further cause the wireless communication device to select the best neighbor base station as the new serving base station instead of sending a measurement report message to the current serving base station.

5. The wireless communication device of claim 1, wherein the new serving base station is configured to:
fetch device context information from the present serving base station; and
reestablish RRC connection with the wireless communication device according to the device context information.

6. A method for reducing handover failure rates between wireless devices in a wireless communication network during connected discontinuous (C-DRX) mode of operation, the method comprising:
measuring, by a wireless communication device during an on-duration of C-DRX mode of operation, radio quality of a current serving base station and one or more neighbor base stations;
selecting, by the wireless communication device, a best neighbor base station from the one or more neighbor base stations as a new serving base station responsive to measuring the radio quality of the current serving base station and the one or more neighbor base stations; and
transmitting, by the wireless communication device, a radio resource control (RRC) connection-reestablishment message to the new serving base station, to have the new serving base station initiate a handover operation to the new serving base station.

7. The method of claim 6, wherein the RRC connection-reestablishment message comprises information corresponding to the current serving base station.

8. The method of claim 6, wherein selecting the best neighbor base station comprises selecting the best neighbor base station responsive to at least one of the following:
the radio quality of the current serving base station not being higher by at least a specified amount than a radio link failure threshold;
the radio quality of at least one of the one or more neighbor base stations being better than the radio quality of the current serving base station; or
a difference between the radio quality of the current serving base station and the radio quality of the at least one of the one or more neighbor base stations having a value that meets a handover threshold requirement.

9. The method of claim 6, further comprising:
selecting, by the wireless communication device, the best neighbor base station instead of transmitting, by the wireless communication device, a measurement report message to the current serving base station.

10. The method of claim 6, further comprising:
establishing, by the new serving base station, RRC connection with the wireless communication device responsive to the handover procedure triggered by the wireless communication device.

11. The method of claim 10, further comprising:
fetching, by the new serving base station, device context information from the present serving base station, responsive to an RRC connection-reestablishment message transmitted by the wireless communication device to the new serving base station as part of triggering the handover procedure;
wherein establishing, by the new serving base station, the RRC connection with the wireless communication device comprises establishing the RRC connection according to the device context information.

12. A wireless communication system comprising:
a wireless communication device configured to:
wirelessly communicate with a first base station acting as a serving cell for the wireless communication device;
measure respective radio quality indicators of the first base station and a plurality of second base stations during an on-duration of a connected discontinuous (C-DRX) mode of operation;
select one of the plurality of second base stations as a new serving cell for the wireless communication device according to the respective radio quality indicators of the first base station and the plurality of second base stations; and send a radio resource control (RCC) connection-reestablishment message to the selected second base station to cause the selected second base station to initiate a handover operation to the new serving cell for the wireless communication device.

13. The wireless communication system of claim 12, further comprising the first base station and the plurality of second base stations.

14. The wireless communication system of claim 13, wherein the selected second base station is configured to:
fetch device context information from the first base station responsive to the handover procedure triggered by the wireless communication device; and
reestablish RRC connection with the wireless communication device according to the device context information.

15. The wireless communication system of claim 12, wherein the RRC connection-reestablishment message comprises information identifying the first base station.

16. The wireless communication system of claim 12, wherein the radio quality corresponds to at least one of:
received signal strength indicator (RSSI);
reference (received) signal code power (RSCP); or
reference signal received quality (RRSQ).

17. The wireless communication system of claim 12, wherein the wireless communication device is configured to select the new serving cell responsive to:
the radio quality of the first base station not being higher than a radio link failure threshold by at least a specified amount;
the radio quality of at least one of the plurality of second base stations being better than the radio quality of the first base station; and
a difference between the radio quality of the first base station and the radio quality of the at least one of the plurality of second base stations having a value at least as high as a specified handover threshold.

* * * * *